(12) United States Patent
Hung

(10) Patent No.: US 7,327,373 B2
(45) Date of Patent: Feb. 5, 2008

(54) 3D DITHER ALGORITHM

(75) Inventor: Richard Hung, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 753 days.

(21) Appl. No.: 10/708,522

(22) Filed: Mar. 9, 2004

(65) Prior Publication Data

US 2005/0200901 A1    Sep. 15, 2005

(51) Int. Cl.
*G06F 15/00*    (2006.01)
*G06K 15/00*    (2006.01)
*G09G 3/20*    (2006.01)
*G09G 3/26*    (2006.01)
*G09G 5/00*    (2006.01)

(52) U.S. Cl. ............... 345/596; 345/561; 345/692; 345/694; 345/581; 348/456; 358/3.13; 358/3.14; 358/3.21

(58) Field of Classification Search .......... 345/419, 345/428, 581, 588, 589, 596, 600, 605, 611, 345/618, 698, 690–696, 561–562, 54–55, 345/63, 599, 209; 358/3.13–3.21, 533, 536; 348/448, 456, 459, 463, 477–479, 422.1, 348/430.1

See application file for complete search history.

(56) References Cited

U.S. PATENT DOCUMENTS

| | | | | |
|---|---|---|---|---|
| 5,264,840 A | * | 11/1993 | Wells et al. | 345/599 |
| 6,147,671 A | * | 11/2000 | Agarwal | 345/691 |
| 6,714,206 B1 | * | 3/2004 | Martin et al. | 345/589 |
| 2002/0005854 A1 | * | 1/2002 | Deering et al. | 345/596 |
| 2002/0190931 A1 | * | 12/2002 | Thebault et al. | 345/63 |

* cited by examiner

*Primary Examiner*—Wesner Sajous
(74) *Attorney, Agent, or Firm*—Jianq Chyun IP Office

(57) ABSTRACT

A four-time resolution refinement of 3D-dither algorithm is provided in this present invention. A 4×2 pixel-block is treated as an observed unit in this present invention, which includes two 2×2 pixel-blocks. In order to eliminate moving lines and dithered edges, the two least significant bits (LSBs) of the pixels are treated depending on cases. For the first 2×2 pixel-block, when 2-bit LSBs being 01 and 11, the pixel being assigned a carry is an upper-left, lower-right, lower-left, and upper-right sequence in a 2×2 pixel-block for four sequential frames. For the second 2×2 pixel-block, when 2-bit LSBs being 01 and 11, the pixel being assigned a carry is a lower-left, upper-right, upper-left, and lower-right sequence in a 2×2 pixel-block for four sequential frames. For both 2×2 pixel blocks, no pixel is treated for 2-bit LSBs being 00. For 2-bit LSBs being 10, the pixel row of the 4×2 block switches between the upper and the lower row for every frame. Another embodiment similar to the above first embodiment is also provided in the present invention.

6 Claims, 4 Drawing Sheets

| Input Pattern (LSBs, 2 bits) | | | | 1st Frame (Carry) | | | | 2nd Frame (Carry) | | | | 3rd Frame (Carry) | | | | 4th Frame (Carry) | | | |
|---|---|---|---|---|---|---|---|---|---|---|---|---|---|---|---|---|---|---|---|
| 00 | 00 | 00 | 00 | 0 | 0 | 0 | 0 | 0 | 0 | 0 | 0 | 0 | 0 | 0 | 0 | 0 | 0 | 0 | 0 |
| 00 | 00 | 00 | 00 | 0 | 0 | 0 | 0 | 0 | 0 | 0 | 0 | 0 | 0 | 0 | 0 | 0 | 0 | 0 | 0 |
| 01 | 01 | 01 | 01 | 1 | 0 | 0 | 0 | 0 | 0 | 0 | 1 | 0 | 0 | 1 | 0 | 0 | 1 | 0 | 0 |
| 01 | 01 | 01 | 01 | 0 | 0 | 1 | 0 | 0 | 1 | 0 | 0 | 1 | 0 | 0 | 0 | 0 | 0 | 0 | 1 |
| 10 | 10 | 10 | 10 | 0 | 0 | 0 | 0 | 1 | 1 | 1 | 1 | 0 | 0 | 0 | 0 | 1 | 1 | 1 | 1 |
| 10 | 10 | 10 | 10 | 1 | 1 | 1 | 1 | 0 | 0 | 0 | 0 | 1 | 1 | 1 | 1 | 0 | 0 | 0 | 0 |
| 11 | 11 | 11 | 11 | 0 | 1 | 1 | 1 | 1 | 1 | 1 | 0 | 1 | 1 | 0 | 1 | 1 | 0 | 1 | 1 |
| 11 | 11 | 11 | 11 | 1 | 1 | 0 | 1 | 1 | 0 | 1 | 1 | 0 | 1 | 1 | 1 | 1 | 1 | 1 | 0 |

| Input Pattern (LSBs, 2 bits) | | | | All Frames (Carry) | | | |
|---|---|---|---|---|---|---|---|
| 00 | 00 | 00 | 00 | 0 | 0 | 0 | 0 |
| 00 | 00 | 00 | 00 | 0 | 0 | 0 | 0 |
| 01 | 01 | 01 | 01 | 0 | 1 | 0 | 1 |
| 01 | 01 | 01 | 01 | 0 | 0 | 0 | 0 |
| 10 | 10 | 10 | 10 | 0 | 1 | 0 | 1 |
| 10 | 10 | 10 | 10 | 1 | 0 | 1 | 0 |
| 11 | 11 | 11 | 11 | 1 | 0 | 1 | 0 |
| 11 | 11 | 11 | 11 | 1 | 1 | 1 | 1 |

FIG. 1 (PRIOR ART)

| Input Pattern (LSBs, 2 bits) | | 1st Frame (Carry) | | 2nd Frame (Carry) | | 3rd Frame (Carry) | | 4th Frame (Carry) | |
|---|---|---|---|---|---|---|---|---|---|
| 00 | 00 | 0 | 0 | 0 | 0 | 0 | 0 | 0 | 0 |
| 00 | 00 | 0 | 0 | 0 | 0 | 0 | 0 | 0 | 0 |
| 01 | 01 | 1 | 0 | 0 | 1 | 0 | 0 | 0 | 0 |
| 01 | 01 | 0 | 0 | 0 | 0 | 0 | 1 | 1 | 0 |
| 10 | 10 | 1 | 0 | 0 | 1 | 1 | 0 | 0 | 1 |
| 10 | 10 | 0 | 1 | 1 | 0 | 0 | 1 | 1 | 0 |
| 11 | 11 | 0 | 1 | 1 | 0 | 1 | 1 | 1 | 1 |
| 11 | 11 | 1 | 1 | 1 | 1 | 1 | 0 | 0 | 1 |

FIG. 2A (PRIOR ART)

| Input Pattern (LSBs, 2 bits) | | 1st Frame (Carry) | | 2nd Frame (Carry) | | 3rd Frame (Carry) | | 4th Frame (Carry) | |
|---|---|---|---|---|---|---|---|---|---|
| 00 | 00 | 0 | 0 | 0 | 0 | 0 | 0 | 0 | 0 |
| 00 | 00 | 0 | 0 | 0 | 0 | 0 | 0 | 0 | 0 |
| 01 | 01 | 1 | 0 | 0 | 0 | 0 | 0 | 0 | 1 |
| 01 | 01 | 0 | 0 | 0 | 1 | 1 | 0 | 0 | 0 |
| 10 | 10 | 1 | 0 | 0 | 1 | 1 | 0 | 0 | 1 |
| 10 | 10 | 0 | 1 | 1 | 0 | 0 | 1 | 1 | 0 |
| 11 | 11 | 0 | 1 | 1 | 1 | 1 | 1 | 1 | 0 |
| 11 | 11 | 1 | 1 | 1 | 0 | 0 | 1 | 1 | 1 |

FIG. 2B (PRIOR ART)

| Input Pattern (LSBs, 2 bits) | | 1st Frame (Carry) | | 2nd Frame (Carry) | | 3rd Frame (Carry) | | 4th Frame (Carry) | |
|---|---|---|---|---|---|---|---|---|---|
| 00 | 00 | 0 | 0 | 0 | 0 | 0 | 0 | 0 | 0 |
| 00 | 00 | 0 | 0 | 0 | 0 | 0 | 0 | 0 | 0 |
| 01 | 01 | 1 | 0 | 0 | 0 | 0 | 1 | 0 | 0 |
| 01 | 01 | 0 | 0 | 1 | 0 | 0 | 0 | 0 | 1 |
| 10 | 10 | 1 | 0 | 0 | 1 | 1 | 0 | 0 | 1 |
| 10 | 10 | 0 | 1 | 1 | 0 | 0 | 1 | 1 | 0 |
| 11 | 11 | 0 | 1 | 1 | 1 | 1 | 0 | 1 | 1 |
| 11 | 11 | 1 | 1 | 0 | 1 | 1 | 1 | 1 | 0 |

FIG. 2C (PRIOR ART)

| Input Pattern (LSBs, 2 bits) | | | | 1st Frame (Carry) | | | | 2nd Frame (Carry) | | | | 3rd Frame (Carry) | | | | 4th Frame (Carry) | | | |
|---|---|---|---|---|---|---|---|---|---|---|---|---|---|---|---|---|---|---|---|
| 00 | 00 | 00 | 00 | 0 | 0 | 0 | 0 | 0 | 0 | 0 | 0 | 0 | 0 | 0 | 0 | 0 | 0 | 0 | 0 |
| 00 | 00 | 00 | 00 | 0 | 0 | 0 | 0 | 0 | 0 | 0 | 0 | 0 | 0 | 0 | 0 | 0 | 0 | 0 | 0 |
| 01 | 01 | 00 | 00 | 1 | 0 | 0 | 0 | 0 | 0 | 0 | 0 | 0 | 0 | 1 | 0 | 0 | 1 | 0 | 0 |
| 01 | 01 | 01 | 00 | 0 | 1 | 0 | 0 | 1 | 0 | 0 | 0 | 1 | 0 | 0 | 0 | 0 | 0 | 1 | 0 |
| 10 | 10 | 10 | 01 | 0 | 0 | 0 | 1 | 0 | 1 | 1 | 0 | 0 | 1 | 0 | 1 | 1 | 0 | 1 | 1 |
| 10 | 10 | 10 | 10 | 1 | 1 | 1 | 1 | 1 | 0 | 0 | 1 | 1 | 1 | 1 | 0 | 0 | 1 | 0 | 0 |
| 11 | 11 | 11 | 11 | 1 | 1 | 1 | 1 | 1 | 1 | 0 | 1 | 1 | 1 | 0 | 1 | 1 | 1 | 1 | 1 |
| 11 | 11 | 11 | 11 | 0 | 1 | 1 | 1 | 1 | 1 | 1 | 1 | 0 | 1 | 1 | 1 | 1 | 1 | 1 | 0 |

FIG. 3A

| Input Pattern (LSBs, 2 bits) | | | | 1st Frame (Carry) | | | | 2nd Frame (Carry) | | | | 3rd Frame (Carry) | | | | 4th Frame (Carry) | | | |
|---|---|---|---|---|---|---|---|---|---|---|---|---|---|---|---|---|---|---|---|
| 00 | 00 | 00 | 00 | 0 | 0 | 0 | 0 | 0 | 0 | 0 | 0 | 0 | 0 | 0 | 0 | 0 | 0 | 0 | 0 |
| 00 | 00 | 00 | 00 | 0 | 0 | 0 | 0 | 0 | 0 | 0 | 0 | 0 | 0 | 0 | 0 | 0 | 0 | 0 | 0 |
| 01 | 01 | 01 | 01 | 1 | 0 | 0 | 0 | 0 | 1 | 0 | 0 | 0 | 0 | 1 | 0 | 0 | 0 | 0 | 1 |
| 01 | 01 | 01 | 01 | 0 | 1 | 0 | 0 | 0 | 0 | 1 | 0 | 1 | 0 | 0 | 1 | 0 | 1 | 0 | 0 |
| 10 | 10 | 10 | 10 | 0 | 0 | 1 | 1 | 1 | 1 | 0 | 0 | 0 | 1 | 0 | 1 | 1 | 0 | 1 | 0 |
| 10 | 10 | 10 | 10 | 1 | 0 | 0 | 1 | 0 | 0 | 1 | 1 | 1 | 1 | 0 | 0 | 0 | 1 | 1 | 0 |
| 11 | 11 | 11 | 11 | 0 | 1 | 1 | 1 | 1 | 0 | 1 | 1 | 1 | 1 | 1 | 0 | 1 | 0 | 1 | 1 |
| 11 | 11 | 11 | 11 | 1 | 0 | 1 | 1 | 1 | 1 | 0 | 1 | 0 | 1 | 1 | 1 | 1 | 1 | 0 | 1 |

FIG. 3B

3D DITHER ALGORITHM

BACKGROUND OF INVENTION

1. Field of the Invention

This invention generally relates to a dither algorithm, and more particularly to a dynamic dither algorithm for a four-time resolution refinement of an image, both spatially and temporally.

2. Description of Related Art

In conventional dither algorithm for 6-bit source drivers of thin-film-transistor liquid crystal display (TFT LCD) panel, an 8 to 6-bit resolution dither function is provided. The dither function manages to mimic 256 colors, being supposed to be synthesized to 8-bit, with only 6-bit. Two algorithms are mainly provided in a conventional scheme.

One is 2-dimension (2D) static dither, and the other is 3-dimension (3D) dynamic dither. Generally, in both algorithms, each block of 2×2 pixels is observed on an image. For the 2D-dither algorithm, it offers constant pattern for "carry" among the observed blocks on the image and lower quality is obtained, yet the 3D-dither is more flexible in providing "carry" pattern, and improves the defects to 2D-dither. However, 3D-dither has to be well designed so that moving pixels or dithered edges are avoided for an image of frames. Detail descriptions of "carry" and an observed block are provided as follows.

Referring to FIG. 1 for a brief description of 2D-dither algorithm. An 8 to 6-bit dither is exemplary, yet a 10 to 8-bit, 8 to 6-bit, or 6 to 4-bit dither are performed similarly. Basically, the concept of dither is to add one "carry" (one "carry" is equal to the quantity of 4, in a 2-bit LSBs case) to the valid 6-bit MSBs at proper position and proper time. Firstly, with the 2-bit LSBs being 00, no carry is generated for the 6-bit MSBs among the four pixels of an observed block, to which the pixel under operation belongs. Secondly, with the 2-bit LSBs being 01, one of the four pixels is added a carry for the 6-bit MSBs. Furthermore, with the LSBs being 10, two of the four pixels are added a carry for the 6-bit MSBs, thus an average extra pixel value of 2 is obtained. Lastly, with the LSBs being 11, three of the four pixels are added a carry for the 6-bit MSBs, so that an average pixel value of 3 is obtained. According to foregoing description, a 2D-dither algorithm is easy to implement, for carry is only added in spatial domain. This exemplary 2D-dither method is shown in the table of FIG. 1.

In 2D-dither algorithm, every single pixel is of the same value of every frame with the same input image, constant patterns, such as dot moiré (when the LSBs are 10) or quad dot (when the LSBs are 01 or 11) is observed on the screen. Thus this static is seldom used for dithering colors.

3D-dither algorithm, being enhancement of 2D-dither, is described herein in a conventional scheme. Besides dither in spatial domain, 3D dither also provides dithering in temporal domain. With dynamic dither on the screen, moving pixels are observed, especially on a fast response panel. The basic observed unit of the conventional 3D-dither method is as well 2×2 bock, including 4 pixels. With each the LSBs 2-bit being 10, the conventional 3D-dither method provides moving pixels moving left and right at the first horizontal scan line, and right and left at the second horizontal scan line. With each the LSBs being 01 or 11, the conventional 3D-dither method has three basic approaches, described as follows.

The first conventional method for 3D-dither is that the moving pixel goes upper-left, upper-right, lower-right, and lower-left for sequential frames for all the 2×2 blocks. The second conventional method for 3D-dither is that the moving pixel goes upper-left, lower-right, lower-left, and upper-right for sequential frames for all the 2×2 blocks. The third one is that the moving pixel goes upper-left, lower-left, upper-right, and lower-right for sequential frames for all the 2×2 blocks. The tables in FIGS. 2A to 2C depict foregoing descriptions of the conventional 3D scheme therein.

The general drawbacks of 3D-dither occur in the three conventional methods. There is no problem for the LSBs being 10. Yet with the LSBs being 01, horizontal lines move when the first method (FIG. 2A) or the second method (FIG. 2B) is inspected. Besides, with all the 2×2 blocks moving the same way, dithered edges occur at the horizontal gray-256 pattern when the first method or the third method (FIG. 2C) is applied. Thus, drawbacks to 3D dither are inspected in the three conventional methods.

SUMMARY OF INVENTION

An object of the present invention is to provide a 3D-dither algorithm for eliminating moving horizontal and/or vertical lines between frames on a screen.

Another object of the present invention is to provide a 3D-dither algorithm for eliminating dithered edges of the frames on a screen.

In order to prevent drawbacks of the dynamic dither, an observed unit is expanded to 4×2 block, including 8 pixels therein, to make moving pixels more chaotic. The period of this dynamic dither method is still 4 frames. The 3D-dither algorithm according to this present invention is described as follows.

When 2-bit LSBs being 10, the moving pixel always moves up and down. The average value of 2 on the screen is provided, and no drawback as described is found. When the 2-bit LSBs being 01 or 11, the moving pixel (being carry for 01 case; being not carry for 11 case) goes upper-left, lower-right, lower-left, and upper-right sequentially in the first 2×2 block, and goes lower-left, and upper-right, upper-left, lower-right sequentially in the next 2×2 block, thus makes a 4×2 block. In this moving fashion, an average value of 1 or 3 on the screen is observed. This is a variation of the second conventional method. Because there is no horizontal line staying at the same position every two frames, the moving pixels or lines on the screen is not observed on the screen. Besides, the basic observed unit of the invention is the 4×2 block and the adjacent 2×2 blocks behave differently, so dithered edges are not performed. Therefore, 3D dither problems are solved according to this one preferred embodiment of the present invention.

Another dither algorithm is similar to foregoing method, yet the moving rule of the carry element is reverse of the preceding one. When 2-bit LSBs being 10, the moving pixel always moves up and down, being the same as the first embodiment described above. The average value of 2 on the screen is provided accordingly. When the 2-bit LSBs being 01 or 11, the moving pixel (being carry for 01 case; being not carry for 11 case) goes upper-left, upper-right, lower-left, and lower-right sequentially in the first 2×2 block, and goes lower-left, lower-right, upper-left, and upper-right sequentially in the next 2×2 block, thus makes a 4×2 block. In this moving fashion, an average value of 1 or 3 on the screen is observed. Because there is no horizontal line staying at the same position every two frames, the moving pixels or lines on the screen is not observed on the screen. Besides, the basic observed unit of the invention is the 4×2 block and the adjacent 2×2 blocks behave differently, so dithered edges are not performed. Therefore, 3D dither problems are solved according to this another preferred embodiment of the present invention.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF DRAWINGS

FIG. 1 is a table depicting 2D-dither algorithm according to a conventional scheme.

FIGS. 2A to 2C are tables depicting 3D-dither algorithm according to a conventional scheme.

FIGS. 3A to 3B are tables depicting 3D-dither algorithm according to preferred embodiments of the present invention.

DETAILED DESCRIPTION

Referring to FIG. 3A to 3B, tables depicting 3D-dither algorithm are shown according to preferred embodiments of the present invention.

In one preferred embodiment of the present invention, an observed unit is expanded to a 4×2 block, including 8 pixels therein, to make moving pixels more chaotic. The period of this dynamic dither method is still 4 frames. The 3D-dither algorithm according to this present invention is described as follows.

Referring to FIG. 3A firstly. When 2-bit LSBs being 10, the moving pixel always moves up and down. The average value of 2 on the screen is provided, and no drawback as described is found. When the 2-bit LSBs being 01 or 11, the moving pixel (being carry for 01 case; being not carry for 11 case) goes upper-left, lower-right, lower-left, and upper-right sequentially in the first 2×2 block, and go lower-left, and upper-right, upper-left, lower-right sequentially in the next 2×2 block, thus makes a 4×2 block. In this moving fashion, an average value of 1 or 3 on the screen is observed. This is a variation of the second conventional method. Because there is no horizontal line staying at the same position every two frames, the moving pixels or lines on the screen is not observed on the screen. Besides, the basic observed unit of the invention is the 4×2 block and the adjacent 2×2 blocks behave differently, so dithered edges are not performed. Therefore, 3D dither problems are solved according to this one preferred embodiment of the present invention.

Referring to FIG. 3B, where another dither algorithm is demonstrated in a similar fashion to foregoing method, yet the moving rule of the carry element is the reverse of the preceding one. When 2-bit LSBs being 10, the moving pixel always moves up and down, being the same as the first embodiment described above. The average value of 2 on the screen is provided accordingly. When the 2-bit LSBs being 01 or 11, the moving pixel (being carry for 01 case; being not carry for 11 case) goes upper-left, upper-right, lower-left, and lower-right sequentially in the first 2×2 block, and goes lower-left, lower-right, upper-left, and upper-right sequentially in the next 2×2 block, thus makes a 4×2 block. In this moving fashion, an average value of 1 or 3 on the screen is observed. Because there is no horizontal line staying at the same position every two frames, the moving pixels or lines on the screen is not observed on the screen. Besides, the basic observed unit of the invention is the 4×2 block and the adjacent 2×2 blocks behave differently, so dithered edges are not performed. Therefore, 3D dither problems are solved according to this another preferred embodiment of the present invention.

The above is a brief description of some deficiencies in the prior art and advantages of the present invention. Other features, advantages and embodiments of the invention will be apparent to those skilled in the art from the following description, accompanying drawings and appended claims.

The above description provides a full and complete description of the preferred embodiments of the present invention. Various modifications, alternate construction, and equivalence may be made by those skilled in the art without changing the scope or spirit of the invention. Accordingly, the above description and illustrations should not be construed as limiting the scope of the invention which is defined by the following claims.

The invention claimed is:

1. A dither algorithm, for four-time resolution refining for an image comprising a plurality of frames scanned with a plurality of pixels, each pixel comprising a plurality of bits, an observed unit being a 4×2 block of the pixels, the observed unit having a first sub unit and a second sub unit, each the sub unit comprising a 2×2 block of the pixels, the 2×2 block having an upper-left pixel, an upper-right pixel, a lower-left pixel, and a lower-right pixel, the 2×2 block having an upper row consisting of the upper-left pixel and the upper-right pixel, and having a lower row consisting of the lower-left pixel and the lower-right pixel, the dither algorithm comprising:

for each of the pixels of the first sub unit of the observed unit, when the 2-bit least significant bits (LSBs) being 00, no operation is rendered, when the 2-bit LSBs being 01, a first operation is rendered in repeated sequential fashion in a four-frame period to the upper-left pixel, the lower-right pixel, the lower-left pixel, and the upper-right pixel, when the 2-bit LSBs being 10, a second operation is rendered in repeated sequential fashion in a two-frame period to the pixels of the lower row and the pixels of the upper row, when the 2-bit LSBs being 11, a third operation is rendered as the first operation is; and for each of the pixels of the second sub unit of the observed unit, when the 2-bit LSBs being 00, no operation is rendered, when the 2-bit LSBs being 01, a fourth operation is rendered in repeated sequential fashion in the four-frame period to the lower-left pixel, the upper-right pixel, the upper-left pixel, and the lower-right pixel, when the 2-bit LSBs being 10, a fifth operation is rendered in repeated sequential fashion in the two-frame period as the second operation is, when the 2-bit LSBs being 11, a sixth operation is rendered in a repeated sequential fashion in the four-frame period as the fourth operation is.

2. The algorithm as recited in claim 1, wherein the first operation is a carry;

the second operation is the carry;

the third operation is a none-carry;

the fourth operation is the carry;

the fifth operation is the carry; and the sixth operation is the none-carry.

3. The algorithm as recited in claim 2, wherein the carry comprises adding one to the remaining bits except the 2-bit LSBs of the pixel, and adding zero to the remaining bits except the 2-bit LSBs of the other pixels of the 2×2 block; and the none-carry comprises adding zero to the remaining bits except the 2-bit LSBs of the pixel, and adding one to the remaining bits except the 2-bit LSBs of the other pixels of the 2×2 block.

4. A dither algorithm, for four-time resolution refining for an image comprising a plurality of frames scanned with a plurality of pixels, each pixel comprising a plurality of bits, an observed unit being a 4×2 block of the pixels, the observed unit having a first sub unit and a second sub unit, each the sub unit comprising a 2×2 block of the pixels, the 2×2 block having an upper-left pixel, an upper-right pixel, a lower-left pixel, and a lower-right pixel, the 2×2 block having an upper row consisting of the upper-left pixel and the upper-right pixel, and having a lower row consisting of the lower-left pixel and the lower-right pixel, the dither algorithm comprising:

for each of the pixels of the first sub unit of the observed unit, when the 2-bit least significant bits (LSBs) being 00, no operation is rendered, when the 2-bit LSBs being 01, a first operation is rendered in repeated sequential fashion in a four-frame period to the upper-left pixel, the upper-right pixel, the lower-left pixel, the and lower-right pixel, when the 2-bit LSBs being 10, a second operation is rendered in repeated sequential fashion in a two-frame period to the lower rowtemptemp and the upper row, when the 2-bit LSBs being 11, a third operation is rendered as the first operation is; and for each of the pixels of the second sub unit of the observed unit, when the 2-bit LSBs being 00, no operation is rendered, when the 2-bit LSBs being 01, a fourth operation is rendered in repeated sequential fashion in the four-frame period to the lower-left pixel, the lower-right pixel, the upper-left pixel, and the upper-right pixel, when the 2-bit LSBs being 10, a fifth operation is rendered as the second operation is, when the 2-bit LSBs being 11, a sixth operation is rendered as the fourth operation is.

5. The algorithm as recited in claim 4, wherein the first operation is a carry;

the second operation is the carry;

the third operation is a none-carry;

the fourth operation is the carry;

the fifth operation is the carry; and the sixth operation is the none-carry.

6. The algorithm as recited in claim 5, wherein the carry comprises adding one to the remaining bits except the 2-bit LSBs of the pixel, and adding zero to the remaining bits except the 2-bit LSBs of the other pixels of the 2×2 block; and the none-carry comprises adding zero to the remaining bits except the 2-bit LSBs of the pixel, and adding one to the remaining bits except the 2-bit LSBs of the other pixels of the 2×2 block.

* * * * *